United States Patent [19]

Hastings et al.

[11] 4,139,755

[45] Feb. 13, 1979

[54] SNAP-IN BUSHING ELECTRIC SWITCH INCLUDING A FRAME WITH INTEGRAL BACK-UP ELEMENTS HAVING PANEL-ENGAGING RAMPED RISER BARS

[75] Inventors: Jerome K. Hastings; John J. Keranen, both of Sussex, Wis.

[73] Assignee: Cutler-Hammer, Inc., Milwaukee, Wis.

[21] Appl. No.: 702,761

[22] Filed: Jul. 6, 1976

[51] Int. Cl.² ............................................. H01H 9/02
[52] U.S. Cl. ............................... 200/295; 200/296; 248/27.1; 267/158
[58] Field of Search ............. 200/296, 295; 248/27.1, 248/27.3; 339/128, 126 R; 267/158, 160

[56] References Cited

U.S. PATENT DOCUMENTS

| 2,891,103 | 6/1959 | Swengel | 174/153 G |
| 3,182,544 | 5/1965 | Rapata | 174/153 G X |
| 3,719,917 | 3/1973 | Fischer | 339/128 R X |
| 3,941,965 | 3/1976 | Piber | 200/296 |

Primary Examiner—J. V. Truhe
Assistant Examiner—David A. Tone
Attorney, Agent, or Firm—Hugh R. Rather; William A. Autio; Michael E. Taken

[57] ABSTRACT

A toggle switch having a molded insulating frame mounting a snap-in bushing secured thereto for snap-in mounting of the switch in a hole in a mounting pane. This bushing pivotally retains the toggle lever for operating the switch contacts within the base. This frame includes a pair of depending legs between which the insulating switch base is snap-in mounted and retained. This frame has integrally molded therewith a pair of oppositely disposed resilient back-up elements for pressing against the back of the panel, these elements having at their ends ramped riser bars for accommodating a range of different panel thicknesses while retaining the switch against significant movement on the panel during toggle lever operation.

8 Claims, 3 Drawing Figures

U.S. Patent      Feb. 13, 1979      4,139,755
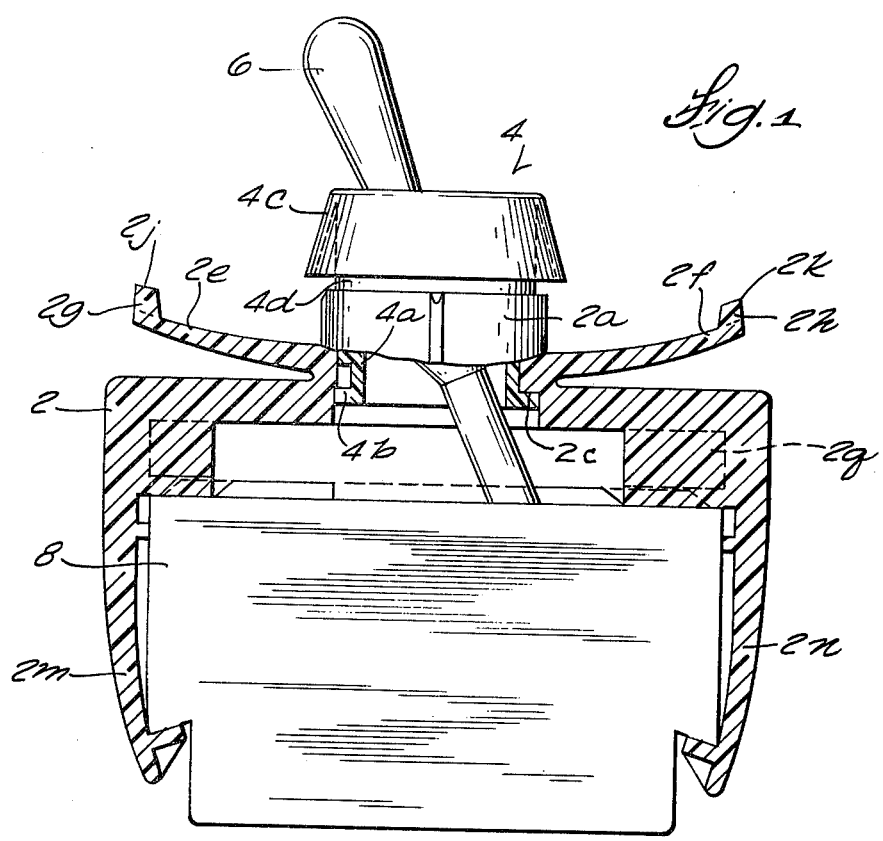
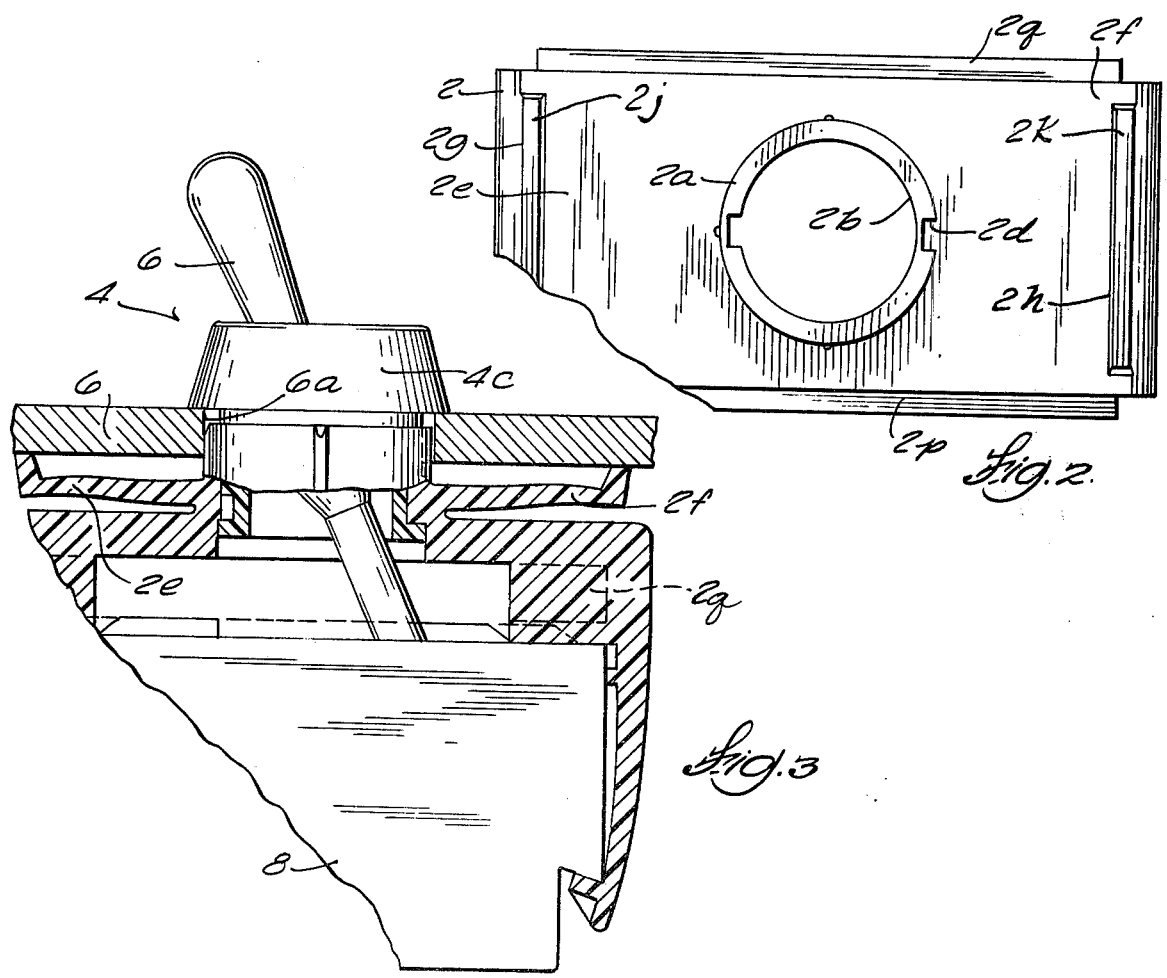

SNAP-IN BUSHING ELECTRIC SWITCH INCLUDING A FRAME WITH INTEGRAL BACK-UP ELEMENTS HAVING PANEL-ENGAGING RAMPED RISER BARS

BACKGROUND OF THE INVENTION

Electric switches of the toggle lever type having a snap-in bushing and back-up elements have been known heretofore. For example, Earl T. Piber U.S. Pat. No. 3,941,965, dated March 2, 1976, and assigned to the assignee of this invention, shows a switch frame having planar or slightly upwardly curved backup elements or wings for abutting and applying a force to the back of the mounting panel so as to draw the snap-in collar against the front of the mounting panel around the hole. These back-up elements have been handicapped by their inability to hold the switch against rocking on the panel when the toggle lever is operated or by their tendency to over-stress if designed to hold the switch tighter on the panel. While that construction has been useful for its intended purpose, this invention relates to improvements thereover.

SUMMARY OF THE INVENTION

An object of the invention is to provide an improved electric switch.

A more specific object of the invention is to provide an electric switch frame with improved means for retaining the switch rigidly and securely to the mounting panel.

Another specific object of the invention is to provide an electric switch with improved snap-in panel hole mounting means that retains the switch rigidly and securely to the panel without over-stressing while accommodating the switch to a range of different panel thicknesses.

Other objects and advantages of the invention will hereinafter appear.

BRIEF DESCRIPTION OF THE DRAWINGS

FIG. 1 is a front elevational view of the switch with part of the frame in cross-section to show the integral backup elements with their ramped riser bars;

FIG. 2 is a top view of the frame of the switch of FIG. 1 with the snap-in bushing and toggle lever removed; and FIG. 3 is a partial view like FIG. 1 showing the switch secured to a mounting panel.

DESCRIPTION OF THE PREFERRED EMBODIMENT

Referring to FIG. 1, there is shown a toggle switch constructed in accordance with the invention. As shown therein, this switch is provided with a frame 2 molded of plastic insulating material or the like. This frame is generally rectangular in top view as shown in FIG. 2 and is provided with a short upstanding collar 2a at the top center having a hole 2b for retaining a bushing 4 which is also molded of plastic insulating material. This bushing has a tubular liner portion 4a that fits snugly down through and lines hole 2b in the frame and is non-rotatably keyed therein as shown in FIGS. 1, 2 and 3. The lower end 4b of this liner portion is formed or flared below a shoulder 2c near the lower end of the hole in the frame to rigidly secure the bushing to the frame.

This bushing is provided with snap-in means for mounting the switch in a hole 6a in a mounting panel 6 as shown in FIGS. 1 and 3. This means comprises an integrally-molded frusto-conical skirt or collar 4c at the upper end of the bushing having a keyway in its right-hand side as seen in FIGS. 1 and 3 coinciding with keyway 2d in collar 2a of the frame shown in FIG. 2. This skirt is integral with the bushing and flared downwardly and outwardly from the upper end of the bushing. Clearance space 4d is provided beneath this skirt in the outer wall around the bushing above collar 2a so that this skirt can be squeezed as it is pushed through the hole in the mounting panel and snaps out or spreads out again on the other side of the panel to abut the front of the panel around the hole and thus to secure the switch to the panel.

To keep the bushing skirt tight against the front of the panel, the frame is provided with a pair of improved back-up elements such as lateral wings 2e and 2f as shown in FIGS. 1 and 3. These wings are integrally molded with the frame of plastic molding material or the like and extend in opposite directions from collar 2a with a gradual upward curvature and taper and terminate in ramped riser bars 2g and 2h, respectively, at their ends. As shown in FIG. 2, these ramped riser bars extend almost all the way across the ends of the respective back-up elements. These riser bars extend upwardly from the ends of the respective back-up elements and are provided with outwardly and slightly upwardly extending inclines or ramps 2j and 2k, respectively, as shown in FIG. 1. As a result, when the switch is mounted on the panel as shown in FIG. 3, these ramped upper surfaces of the riser bars rotate or tip over flat or almost flat, depending upon the thickness of the panel, against the back surface of the panel to limit stressing and prevent overstressing of the back-up elements. This allows use of the snap-in bushing structure on a wider range of panel thicknesses without overstressing the back-up elements.

The inner surface of the bushing is provided with suitable constriction means for pivotally retaining a toggle lever 6 that extends therethrough into a base 8 for actuating the switch contacts in the latter.

Frame 2 is provided with means for snap-in mounting of base 8 thereon and for accommodating bases having slightly differing dimensional tolerances as shown in FIGS. 1 and 3. This means comprises a pair of tapered and curved legs 2m and 2n extending down from the opposite ends of the frame and integrally molded therewith and adapted to be snap-in assembled on and to grip notches in the left and right ends of the base. These legs are generally rectangular plates that taper to a thinner crosssection toward their lower ends while also curving inwardly toward one another. Elongated raised portions 2p and 2q on the front and rear of the base overlie the corresponding sides of the base. The structures of this frame and the base clamped and registered therebetween are more fully described in J. K. Hastings and E. T. Piber copending application Ser. No. 694,389, filed June 9, 1976, assigned to the assignee of this invention.

While the apparatus hereinbefore described is effectively adapted to fulfill the objects stated, it is to be understood that the invention is not intended to be confined to the particular preferred embodiment of snap-in bushing electric switch including a frame with integral back-up elements having panel-engaging ramped riser bars disclosed, inasmuch as it is susceptible of various modifications without departing from the scope of the appended claims.

We claim:

1. A snap-in mounting means for an electric switch having a housing including a frame and a base secured thereto with the base enclosing switch contacts, which mounting means adapts the switch to be mounted from the rear through a hole in a mounting panel so that the switch actuator is accessible at the front of the panel comprising:

a bushing on said frame having a bore therethrough including means for the retaining the switch actuator therein;

a circular locking snap-in skirt on said bushing flaring from the forward end thereof outwardly and back toward the frame;

and a pair of back-up elements on said frame extending from opposite sides of said bushing in opposite directions with small upward angles, said elements being tapered in crosssection and having riser bars at their ends, with the upper surfaces of said riser bars being ramped thereby to accommodate a larger range of panel thicknesses between said snap-in skirt and said riser bars without overstressing said back-up elements.

2. The snap-in mounting means defined in claim 1, wherein:

said back-up elements are generally flat plat-like members integral at one end with said frame and tapering in thickness toward their other ends where they terminate in said riser bars extending substantially all the way thereacross.

3. The snap-in mounting means defined in claim 2, wherein:

said back-up elements have a gradual upward curvature toward said other ends thereof.

4. The snap-in mounting means defined in claim 1, wherein:

each of said ramped riser bars has a narrow and elongated lateral upper surface that slants outwardly and upwardly so that when said back-up elements are pressed against the rear surface of the mounting panel the end portions of said elements and said riser bars will unroll and cause a reduction in the effective height of said riser bars between said elements and the panel thereby to prevent overstressing said back-up elements while accommodating a wider range of panel thicknesses.

5. The snap-in mounting means defined in claim 1, wherein:

said back-up elements are integral at one end with said frame and are spaced from said frame throughout the remainder of their lengths.

6. The snap-in mounting means defined in claim 1, wherein:

said frame including said back-up elements are integrally molded of plastic molding material whereby said back-up elements have some resiliency but are rather stiff thereby to hold the switch securely to the panel.

7. A toggle switch having a housing including an open top base and a frame secured thereto so as to close the top of said base, said base enclosing switch contacts, and mounting means adapting said switch to be mounted from the rear through a hole in a mounting panel so that the toggle lever is accessible at the front of the panel for actuation by the user comprising:

a hole in said frame surrounded by a low collar;

a bushing lining said hole and secured to said frame and having a hole therethrough including means for retaining the toggle lever therein for limited pivotal movement;

a substantially circular snap-in collar on said bushing flaring from the top of said bushing outwardly and toward said frame;

and a pair of generally flat plate-like back-up wings extending from said frame at opposite sides of said low collar thereof in opposite directions at a small upward curvature in spaced relation to said frame, said wings being tapered in thickness toward their ends and terminating in lateral riser bars at their ends so that when said back-up wings are pressed against the rear surface of the mounting panel, these wings will be stressed and the riser bar end portions thereof will rotate outwardly an amount depending upon the thickness of the mounting panel to reduce the effective height of these riser bars between the wings and the mounting panel thereby to accommodate a greater range of thicknesses of mounting panel without overstressing said back-up elements along the lengths thereof.

8. The toggle switch defined in claim 7, wherein:

said riser bars have outwardly and upwardly angled, ramped surfaces for engaging the back surface of the mounting panel with an unrolling motion when said switch is mounted in a hole in the panel.

* * * * *